July 14, 1925. Re. 16,113

R. J. FITZGERALD

CONDENSER

Original Filed Nov. 4, 1919

INVENTOR
Robert J. Fitzgerald
BY
C. W. Fairbank
ATTORNEY

Reissued July 14, 1925. Re. 16,113

UNITED STATES PATENT OFFICE.

ROBERT J. FITZGERALD, OF NEW YORK, N. Y., ASSIGNOR OF ONE-HALF TO J. ARTHUR FISCHER, OF NEW YORK, N. Y.

CONDENSER.

Original No. 1,337,549, dated April 20, 1920, Serial No. 335,774, filed November 4, 1919. Application for reissue filed September 21, 1920. Serial No. 411,827.

*To all whom it may concern:*

Be it known that I, ROBERT J. FITZGERALD, a citizen of the United States, and a resident of the borough of Manhattan, city, county, and State of New York, have invented certain new and useful Improvements in Condensers, of which the following is a specification.

This invention is an improvement in condensers and has for its main object to provide more efficient and more easily applied insulation for the condenser plates. My invention is not limited to any particular form of condenser but possesses special advantages in connection with a condenser of that type in which there are relatively movable plates whereby the capacity may be varied.

As an important feature of my invention I coat the various conducting elements with a non-conducting film permanently deposited thereon and enveloping the conductor. This non-conducting film, coating or jacket is preferably of such a character that it is not affected by the temperature, chemical or electric condition to which the condenser is subjected. As an example of such a film or coating I may employ an enamel composition of such a character that it may be baked on to the plates or other conductors.

In the accompanying drawings I have illustrated merely one embodiment of my invention and have illustrated this on a very greatly enlarged scale, so far as the thickness of certain of the parts is concerned, in order to facilitate clear illustration.

Figure 1:
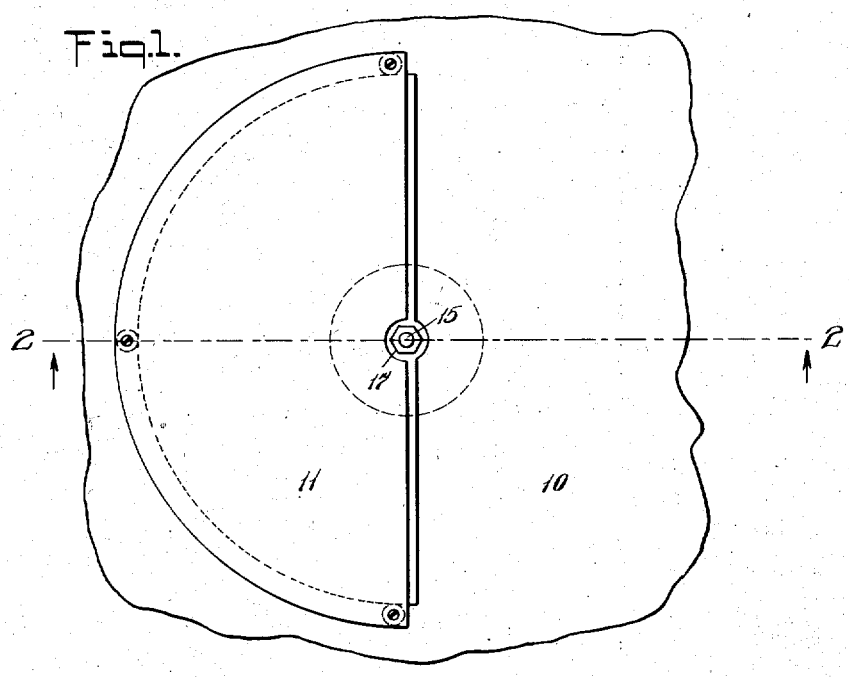
Figure 1 is an inverted plan view.
Figure 2:
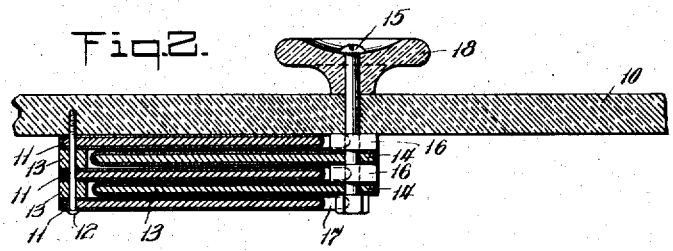
Figure 2 is a section on the line 2—2 of Fig. 1.
Figure 3:
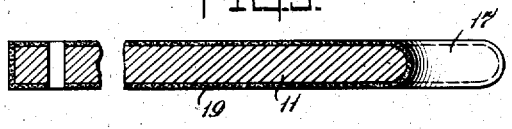
Figure 3 is an enlarged view of one of the elements.

In the form shown, the condenser is mounted on a slab 10 of any suitable non-conducting material. A plurality of stationary condenser elements or plates 11 of substantially semi-circular form are rigidly secured to said slab by connecting bolts 12 or other suitable means and the plates are held in spaced relationship by spacing plugs, collars or strips 13. A second series of substantially semi-circular plates 14 are connected to a shaft or rod 15 and held in proper spaced relationship by spacers 16. The single rod 15 extends through the plates 14 approximately at the center of the curvature and is positioned substantially at the center of the curvature of the stationary plates 11. The latter are shown as cut away midway of the straight side to form a recess 17 receiving the rod 15 and the spacers.

As previously indicated the plates are shown greatly magnified, particularly so far as thickness is concerned. The plates 11 and 14 may be made only approximately one hundredth (.01) of an inch in thickness and the spacers are only of such thickness as to permit the movable plates to freely pass between the stationary ones. With the parts in the position shown in the drawing, the maximum surface of each plate is opposite to that of another plate, whereas by rotating the rod 15 by means of a knob or handle 18, or other suitable means, through 180 degrees the movable plates may be entirely moved from between the stationary ones. As an important feature of my invention each plate has a non-conducting coating 19 thereon, the coating being of the proper thickness in accordance with the electrical pressure to which the condenser is to be subjected. This coating may be of an enamel composition baked on or permanently deposited thereon but, in any event, should be of such material that it will not be affected by and will adequately withstand temperature, chemical or electrical conditions to which the condenser may be subjected.

By means of my invention the use of separate insulation plates is avoided, each plate carries its own insulation and in case of the breakage of the insulation of any plate the plate may be readily removed and replaced by a new one. As previously indicated, I do not wish to be limited to the particular form of condenser illustrated as my invention may be applied to various different types. I do not desire to be limited to the small number of plates shown, as in practice a very large number may be used.

Having thus described my invention what I claim as new, and desire to secure by Letters Patent is:

1. An electric condenser including a plurality of stationary conducting plates and a plurality of interposed movable plates connected together and movable in their own planes into and out of position between said stationary plates, each plate having a non-conducting film or coating deposited on both sides thereof to inclose the plate, the coating of each movable plate being spaced from the coating of the adjacent stationary plate by thin air spaces.

2. An electric condenser including a plurality of stationary conducting plates and a plurality of interposed movable plates connected together and movable in their own planes into and out of position between said stationary plates, each plate having a non-conducting coating on both sides thereof to inclose the plate, the coating of each movable plate being separated from the coating of the adjacent stationary plate.

Signed at New York city, in the county of New York and State of New York, this 16th day of September, A. D. 1920.

ROBERT J. FITZGERALD.